July 3, 1962 H. C. KENDALL ET AL 3,042,303
OBJECT OR VEHICLE DETECTION SYSTEM
Filed April 24, 1959 10 Sheets-Sheet 1
FIG. IA.
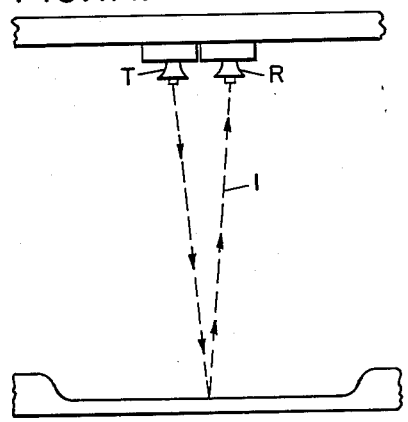
FIG. IB.
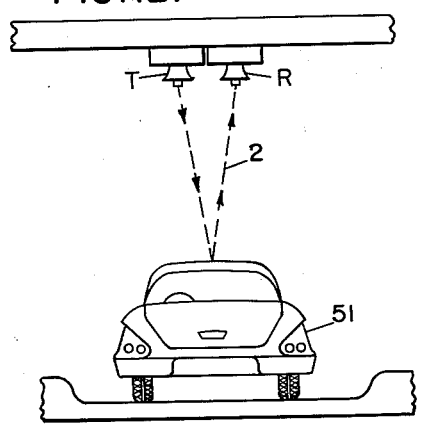
FIG. IC.
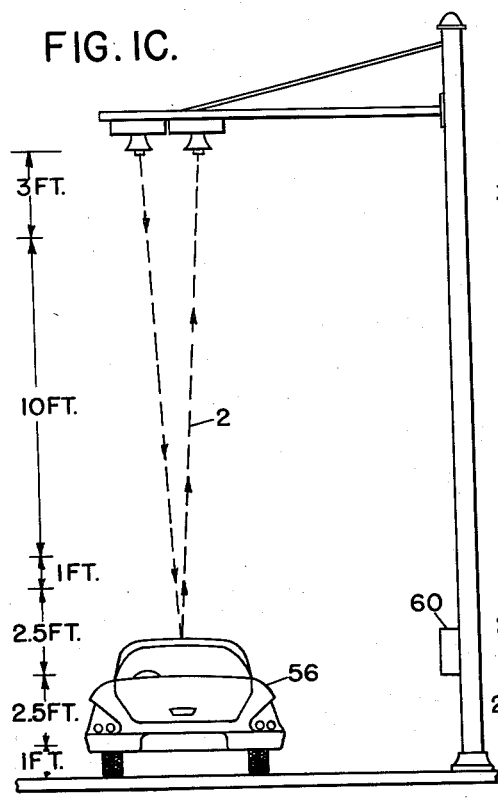
FIG. ID.
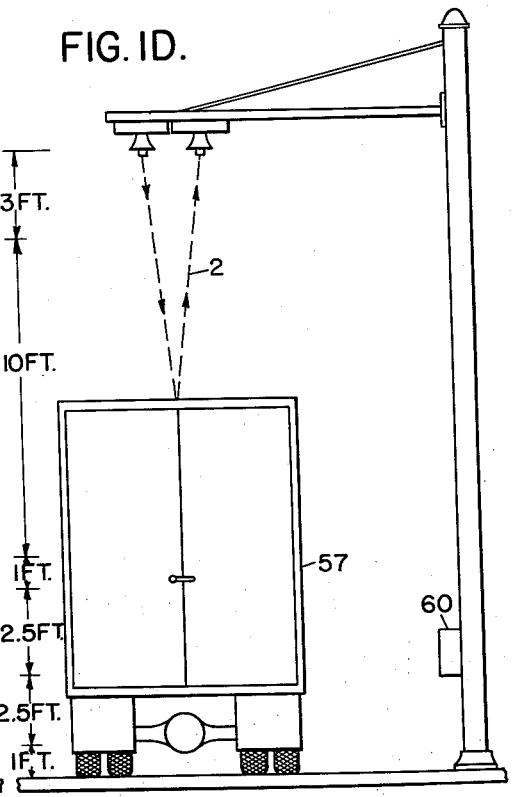
INVENTORS
H.C.KENDALL, J.H.AUER JR.
N.A.BOLTON AND
BY K.H.FRIELINGHAUS
*Forest B. Hitchcock*
THEIR ATTORNEY

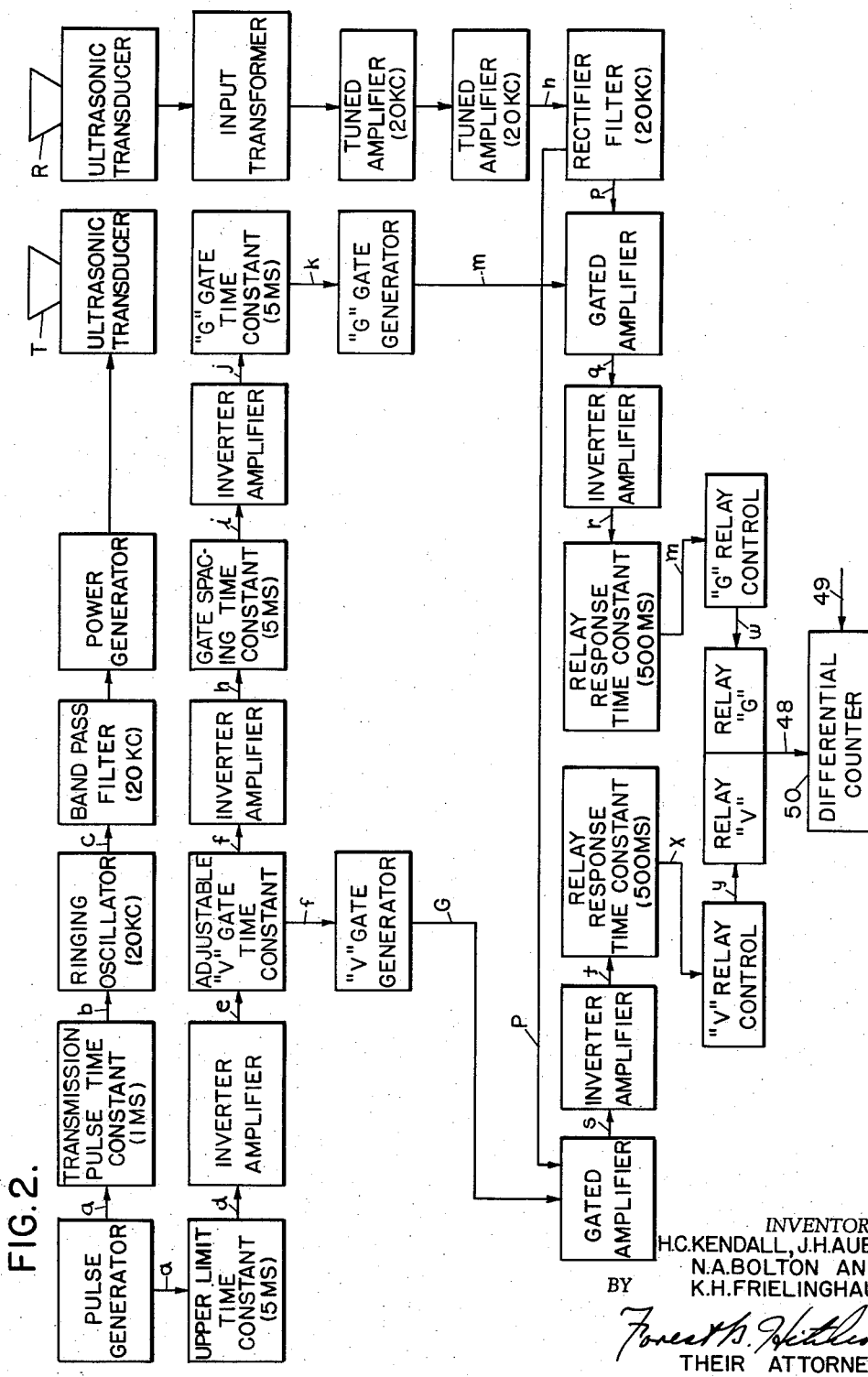

July 3, 1962  H. C. KENDALL ET AL  3,042,303
OBJECT OR VEHICLE DETECTION SYSTEM
Filed April 24, 1959  10 Sheets-Sheet 3
FIG. 3.
PULSE GENERATOR
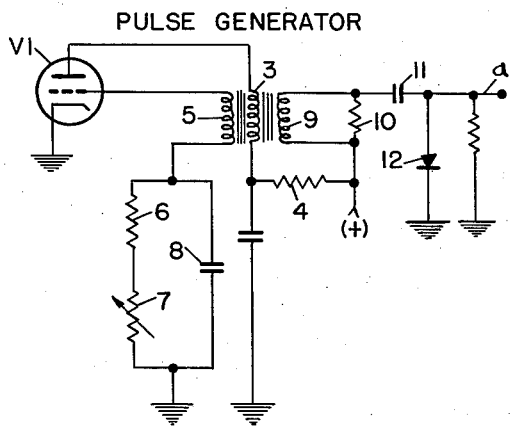
FIG. 4.
TIME CONSTANT AND
RINGING OSCILATOR
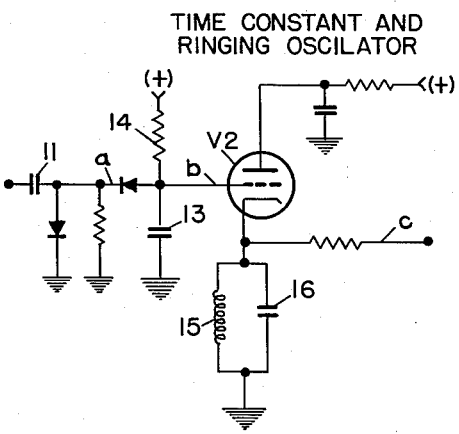
FIG. 5.
TIME CONSTANT AND
INVERTER AMPLIFIER
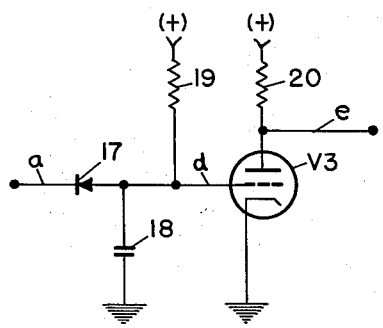
FIG. 6.
ADJUSTABLE TIME CONSTANT
AND GATE GENERATOR
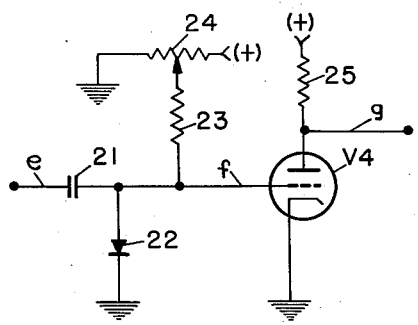
FIG. 12. SINGLE TRANSDUCER
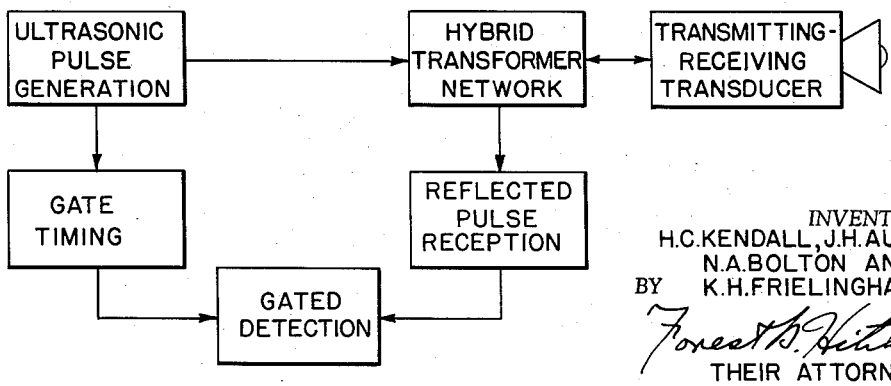
INVENTORS
H.C. KENDALL, J.H. AUER JR.
N.A. BOLTON AND
BY  K.H. FRIELINGHAUS
Forest B. Hitchcock
THEIR ATTORNEY

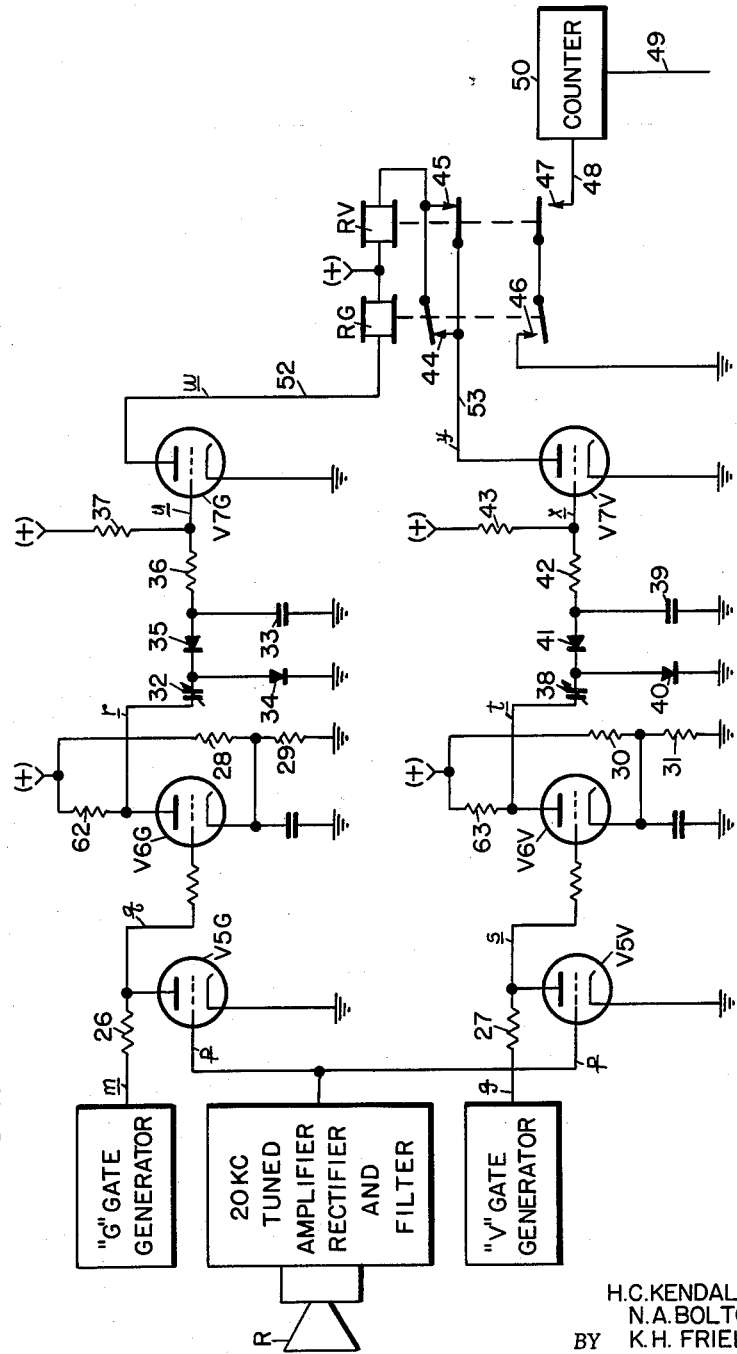

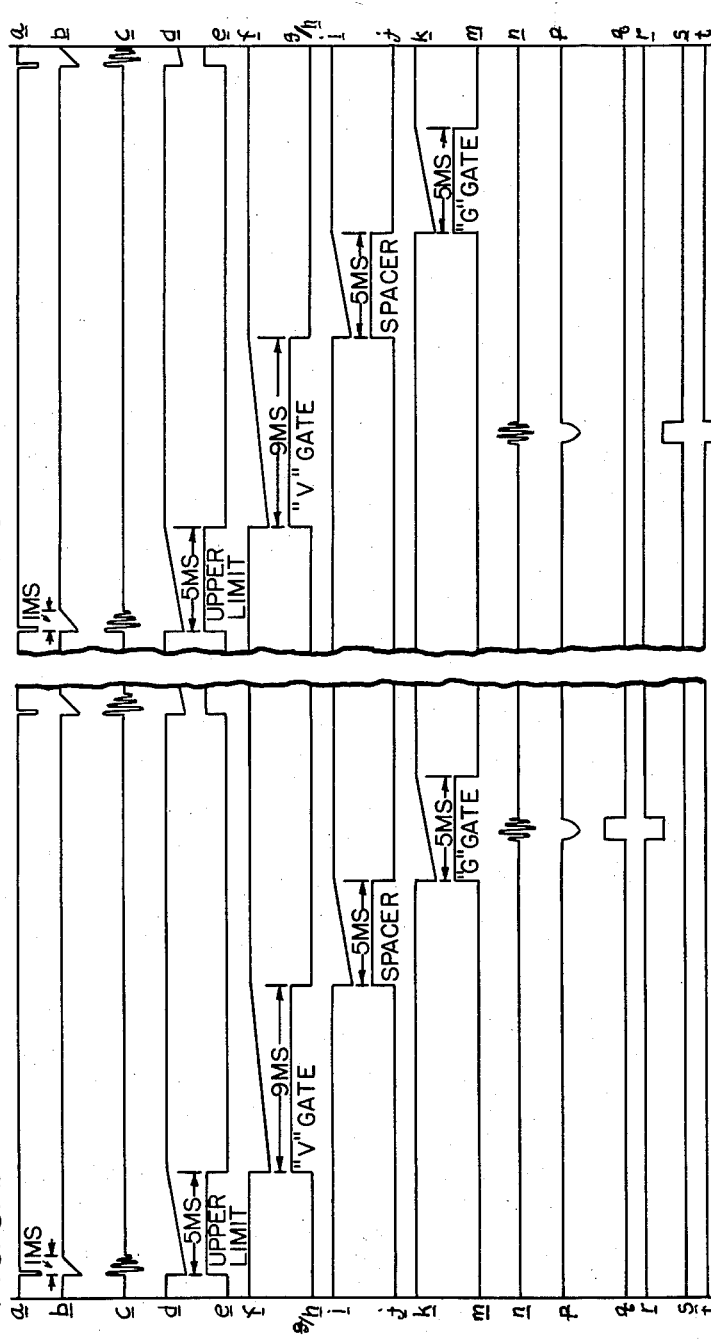

RELAY CONTROL WAVEFORMS - PERSON

RELAY RESPONSE PERSON

RELAY CONTROL WAVEFORMS - CONVERTIBLE

RELAY RESPONSE CONVERTIBLE

INVENTORS
H.C. KENDALL, J.H. AUER JR.
N.A. BOLTON AND
BY K.H. FRIELINGHAUS

THEIR ATTORNEY

INVENTORS
H.C. KENDALL, J.H. AUER JR
N. A. BOLTON AND
BY K. H. FRIELINGHAUS

THEIR ATTORNEY

July 3, 1962 H. C. KENDALL ET AL 3,042,303
OBJECT OR VEHICLE DETECTION SYSTEM
Filed April 24, 1959 10 Sheets-Sheet 8
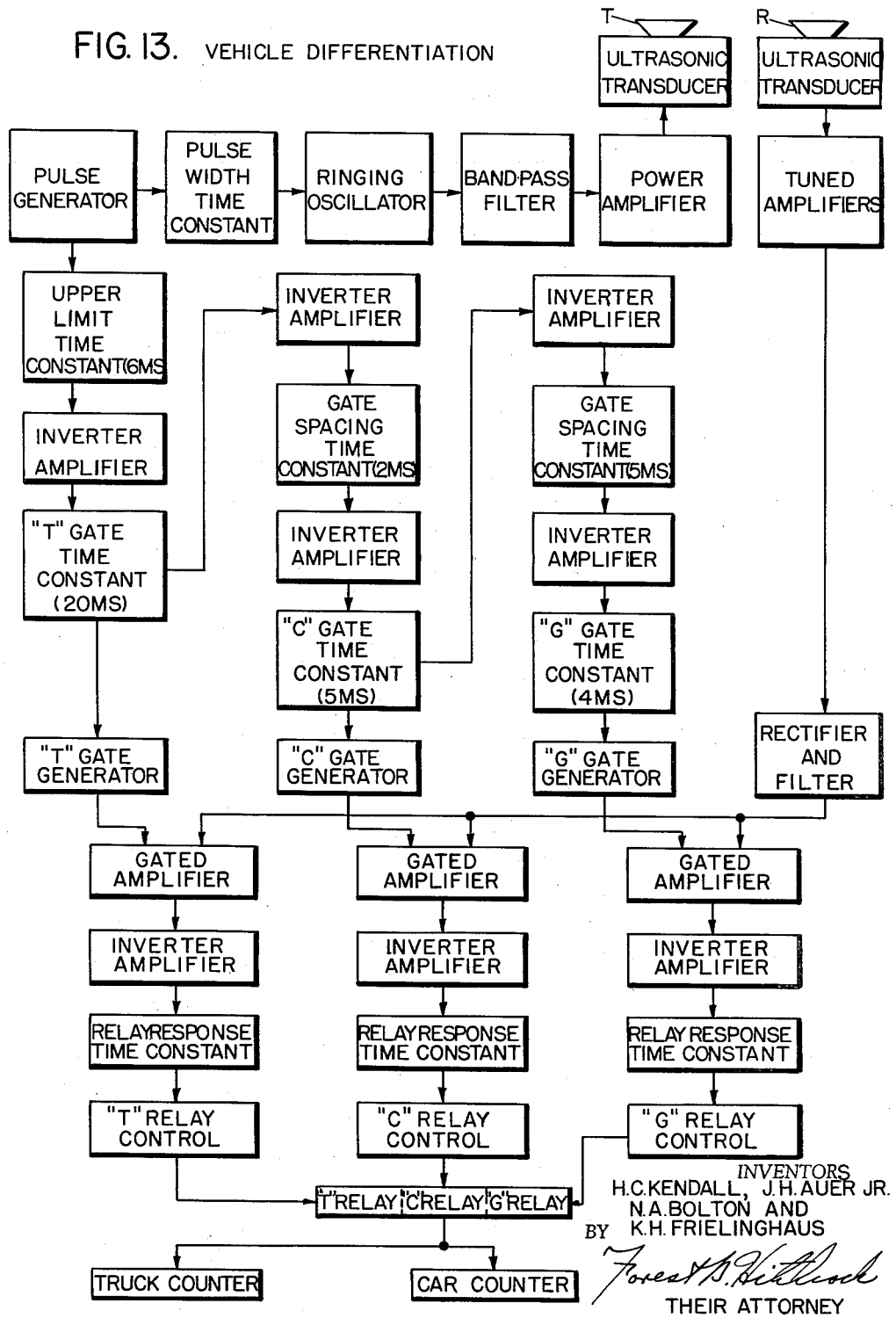
FIG. 13. VEHICLE DIFFERENTIATION
INVENTORS
H.C. KENDALL, J.H. AUER JR.
N.A. BOLTON AND
BY K.H. FRIELINGHAUS
THEIR ATTORNEY July 3, 1962  H. C. KENDALL ET AL  3,042,303
OBJECT OR VEHICLE DETECTION SYSTEM
Filed April 24, 1959  10 Sheets-Sheet 9
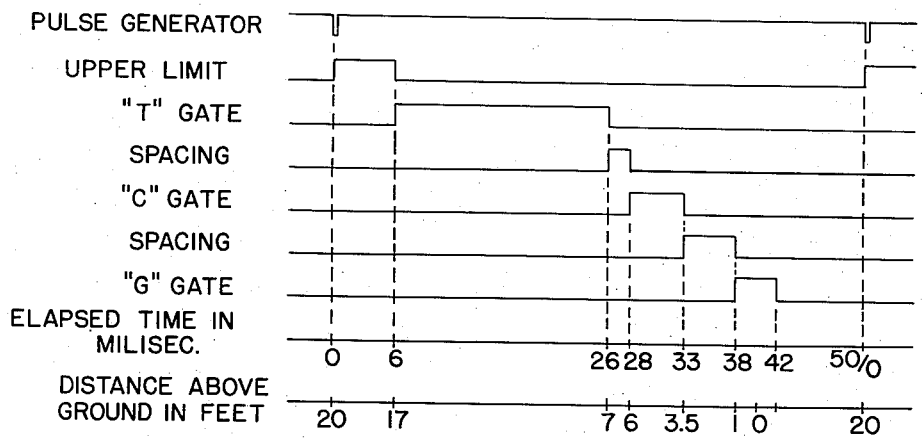
FIG. 14A. GATE TIMING FOR VEHICLES DIFFERENTIATION
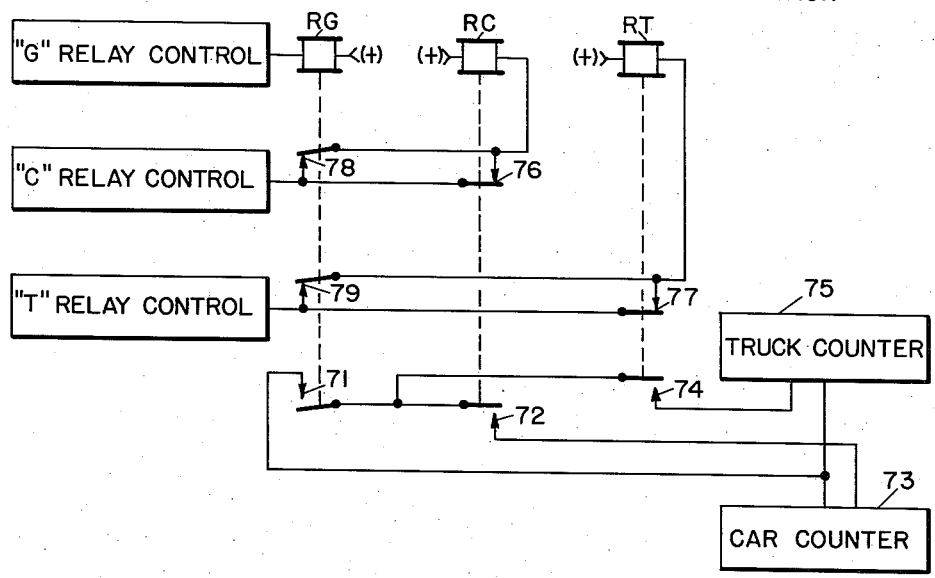
FIG. 14B. RELAYS FOR VEHICLE DIFFERENTIATION
INVENTORS
H.C. KENDALL, J.H. AUER JR.
N.A. BOLTON AND
BY  K.H. FRIELINGHAUS
THEIR ATTORNEY United States Patent Office 3,042,303
Patented July 3, 1962

3,042,303
OBJECT OR VEHICLE DETECTION SYSTEM
Hugh C. Kendall and John H. Auer, Jr., Rochester, Norman A. Bolton, Scottsville, and Klaus H. Frielinghaus, Rochester, N.Y., assignors to General Railway Signal Company, Rochester, N.Y.
Filed Apr. 24, 1959, Ser. No. 808,736
20 Claims. (Cl. 235—99)

This invention relates to the detection of objects by means of energy transmitted toward and reflected from each object, and, more particularly, relates to the detection and differentiation of vehicles by ultrasonic means.

At the present time there are several methods being utilized for purposes of detecting vehicles and counting highway traffic. These include, metal detectors, magnetic loops, photoelectric cells, pneumatic hoses, wheel actuated treadles, radar units, and infrared detectors. Each of these various methods of detection has certain drawbacks which limits its efficiency, effectiveness, or practicality. Most of these methods lack adequate discrimination between vehicles and human beings or animals or birds, others have relatively undefined zones of coverage which render it difficult to differentiate vehicles in separate traffic lanes. Some are rendered ineffective due to adverse weather conditions. While with some of these methods, the major problem is the relatively high cost of equipment, in others, it is the high cost of installing and/or maintaining the equipment.

The invention disclosed herein meets the majority of these problems with a system that is both highly efficient and relatively inexpensive. A beam of energy is directed at a fixed reflecting surface, and the vehicles to be detected pass between the reflecting surface and the transmitter. A receiver (this can be same transducer used for transmission) is located adjacent to the transmitter and is sensitive to any reflected energy. By means of electronic gating circuits, pulses reflected from surfaces nearer the transmitter than the fixed reflecting surface are detected and differentiated. The detection of a vehicle requires the cutting-off of the pulses which are normally reflected from the fixed reflecting surface as well as the receipt of pulses reflected from a surface closer to the transmitter than the said fixed reflecting surface.

When used under certain circumstances, such as in a parking garage, where not only vehicles but people and animals are often passing through the detection area, the invention disclosed herein can be made insensitive to the people and animals while maintaining an accurate count of the passing vehicles. Also, the invention disclosed herein can be adapted to highway use whereby automobiles and trucks travelling at relatively high speeds can be accurately detected and differentiated.

It is an object of this invention to provide a system for the detection of objects as they pass through a detection zone defined by a beam of energy impinging upon each object while it lies within the beam but with said energy being reflected instead from a more distant reflecting surface upon which the energy can impinge only when the vehicle is not within the detection zone.

It is a further object of this invention to provide a system for the detection of an object passing through a detection zone defined by a beam of energy which impinges upon the object when it is within the detection zone and where further means is employed which receives the transmitted energy only when the vehicle is not within the detection zone and where the later means directs energy towards a receiving means only when the transmitted energy impinges thereon. It is further contemplated according to this object of the invention that receiving means will receive both energy reflected from the object to be detected and also from the aforesaid further means and where the object will be registered only upon the concurrent reception or reflected energy from the object together with the absence of energy ordinarily obtained from the aforesaid further means.

It is an object of this invention to provide an ultrasonic system for the detection of objects passing a fixed point.

It is a further object of this invention to provide an ultrasonic system for the differentiation, in accordance with size, of objects passing a fixed point.

It is a further purpose of this invention to provide an ultrasonic system which can produce an accurate count of the vehicles passing a fixed point.

It is a further object of this invention to provide an ultrasonic system which shall count the vehicles passing a fixed point without counting the passage of people, birds, animals, etc.

It is a further object of this invention to provide an ultrasonic system which shall produce a single accurate count for each vehicle passing a fixed point regardless of the particular character of the vehicle or the number of its axles or wheels.

It is a further object of this invention to provide an ultrasonic system which can count the vehicles passing a fixed point and at the same time differentiate each of the passing vehicles in accordance with its relative size.

Other objects, purposes and characteristic features of the present invention will be in part obvious from the accompanying drawings, and in part pointed out as the description of the invention progresses.

For simplifying the illustration and facilitating in the explanation, the various parts and circuits constituting the embodiments of the invention have been shown diagrammatically and certain conventional elements have been left in block form, the drawings having been made more with the purpose of making it easy to understand the principles and mode of operation than with the idea of illustrating the specific construction and arrangement of parts that would be employed in practice. The symbols (+) and (—) are employed to indicate the positive and negative terminals, respectively, of suitable batteries, or other sources of direct current; and the circuits with which these symbols are used always have current flowing in the same direction.

In describing the invention in detail reference will be made to the accompanying drawings, in which like reference characters designate corresponding parts throughout the several views, and in which;

FIGS. 1A and 1B illustrate the manner in which the transducers may be mounted over a detection lane as, for example, at the entrance or exit of a parking garage.

FIGS. 1C and 1D illustrate a possible highway adaption of the vehicle differentiation unit, showing the relative distances marked out by each of the gating systems shown in FIG. 13;

FIG. 2 is a block diagram of a preferred form of the invention used as a vehicle detection system in parking garage;

FIGS. 3, 4, 5, 6 and 7 are schematic diagrams of typical electronic apparatus that may be used to effect the function of the block diagrams illustrated in FIGS. 2 and 12;

FIG. 7A illustrates a modified circuit for the control of the counter shown in FIG. 7.

FIGS. 8A, 8B and 8C are typical waveform diagrams of voltages that may be found at various points in the overall circuit as illustrated in FIG. 2, showing the use of electronic gates to selectively differentiate between reflected pulses of ultrasonic energy;

FIG. 12 is a block diagram showing use of single transducer for both transmission and reception;

FIG. 13 is a block diagram of the invention used as a highway installation for counting the vehicular traffic passing a given point and for differentiating between automobiles and trucks;

FIG. 14A illustrates by waveforms the spacing of the electronic gates in the circuit shown in block form in FIG. 13;

FIG. 14B shows the relay circuits used in conjunction with the vehicle differentiation unit of FIG. 13;

Figure 9A:
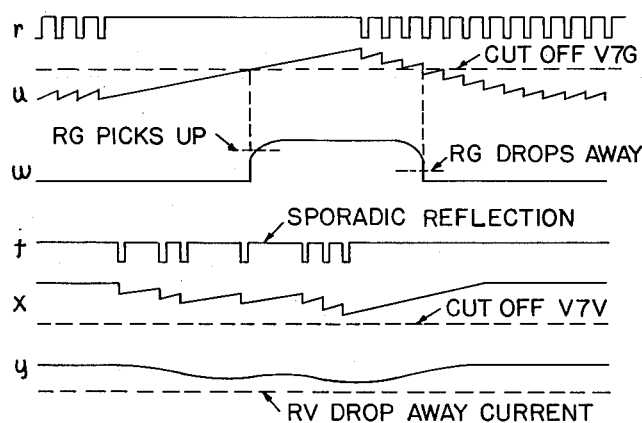
FIGS. 9A and 9B illustrate typical relay control waveforms and relay positions showing how the circuit differentiates the passage of a person walking by the detection area.

This specification shall discuss two basic applications of the invention herein. First, as exemplified by FIGS. 1A and 1B, the invention shall be considered in its application to a parking garage. The second basic application, exemplified by FIGS. 1C and 1D, is the use of the invention as a highway vehicle counter and differentiator.

*Parking Garage Vehicle Detection and Counting*

FIGS. 1A and 1B show two ultrasonic transducers as they might appear mounted over a detection lane (entrance or exit) of a large parking garage. With no vehicle present, as in FIG. 1A, ultrasonic waves 1 eminating from transmitting transducer T are reflected from the surface of the garage floor and picked up by receiving transducer R. When a vehicle 51 (FIG. 1B) passes through the detection area, it cuts off the normally present reflected floor wave 1, and receiving transducer R then picks up vehicle reflection wave 2. It is the combination of the loss of normally reflected wave 1 and the reception of vehicle reflected wave 2 that permits the detection of the vehicle, as will be explained below in detail.

FIG. 2 is a block diagram of the circuitry used in a preferred embodiment of the invention herein when applied as a vehicle detector at a place such as a large parking garage. In describing this circuitry in detail, reference will be made to FIGS. 3, 4, 5, 6, and 7 and to the waveforms set forth in FIGS. 8A, 8B and 8C.

*Ultrasonic Transmission Pulse Generation Circuits*

In the preferred embodiment of this invention, the pulse generator is a single swing blocking oscillator such as that shown in FIG. 3. Assuming that the grid of triode V1 has just risen above cut-off, triode V1 begins to conduct and plate current builds up through plate coil 3 and plate resistor 4, causing an increasing voltage drop over plate resistor 4 which is reflected in plate coil 3 as a negative-going pulse. This negative-going pulse in plate coil 3 induces a positive-going pulse in grid coil 5, and thus as the plate current builds up, the grid of triode V1 is driven further positive, causing a further build-up in plate current, and so on until triode V1 reaches saturation. Since the grid of triode V1 is driven positive with respect to its cathode, the grid draws current through grid resistors 6 and 7, causing the build up of a negative potential across grid capacitor 8.

When triode V1 reaches saturation, the plate current levels off and no voltage is induced in grid coil 5. Triode V1 is then cut-off by the negative voltage that has been built up over grid capacitor 8, and the field around plate coil 3 starts to collapse. This induces negative potential in grid coil 5 and the grid of triode V1 is driven far below cut-off.

Triode V1 does not begin to conduct again until the negative charge on grid capacitor 8 has leaked off through grid resistors 6 and 7 sufficiently to once again raise the grid potential above cut-off, at which time the cycle repeats itself. It can be seen that by varying the resistance of grid resistor 7 it is possible to control the time it takes for the charge to leak from grid capacitor 8, thereby controlling the time between each single swing cycle of the oscillator.

Output coil 9 also responds to the changing field around plate coil 3, and the potential induced in it is reflected across resistor 10 as a positive pulse followed immediately by a negative pulse. While this cycle tries to pass through coupling capacitor 11, point "a" sees only the negative portion of this cycle (see waveform "a" in FIG. 8A) due to the rectifying action of diode 12. It is this short negative pulse that triggers the entire circuit, the time interval between trigger pulses being controlled, as explained above, by varying grid resistance 7.

The negative trigger pulses produced by the pulse generator are fed to the transmission pulse time constant which controls the ultrasonic frequency ringing oscillator. It should be noted that the values assigned to the time constants which appear throughout the block circuits outlined in FIG. 2 are variables dependent upon the placing of the ultrasonic transducers in relation to the fixed reflecting surface being used in any particular application and upon the sizes of the objects to be detected. The values for these time constants shown in FIG. 2 are based upon the arbitrary assumption that the transducers have been mounted ten feet above the floor of a parking garage and that no vehicle higher than 7.5 feet need be detected. These timing circuits shall be covered more fully below.

It should also be noted at this point that, as used throughout this specification and the appended claims, the term "ultrasonic" refers to all wave motion produced by physical vibration (as distinguished from electromagnetic waves) at frequencies above the range of audibility for the human ear, that is, from 15,000 or 20,000 cycles per second and higher. For purposes of this disclosure, the apparatus of the invention has been arbitrarily shown as designed to operate at a frequency of 20 kc.

Throughout the specification and claims where the term "sonic" is employed, it is intended to comprehend all forms of wave motion produced by physical vibration and is thus inclusive as well of ultrasonic energy as already defined. Moreover, the term "energy" wherever referred to, pertains to all forms of energy which may be transmitted through space in a relatively confined beam and thus includes the aforementioned sonic energy but is not necessarily limited thereto.

Referring now to FIG. 4, the negative trigger pulse which appears at point "a" places a negative charge across capacitor 13, driving the grid of triode V2 below cut-off, and this charge leaks off through resistor 14. This RC time constant is designed so that the negative voltage appearing at the grid of triode V2 remains below cut-off for one millisecond. (See waveform "b" in FIG. 8A.)

Triode V2 is normally conducting at a steady rate, passing a steady current flow through coil 15. However, when the negative trigger pulse appears at the grid of triode V2 (point "b"), triode V2 is suddenly cut-off causing the field around coil 15 to collapse which in turn induces the continued flow of current through coil 15. This current can no longer pass through triode V2 which is cut off, and so it charges up capacitor 16 which in turn discharges back through coil 15, and the tank circuit comprising coil 15 and capacitor 16 begins to oscillate at its resonant frequency. For purposes of this disclosure, it is assumed that values for coil 15 and capacitor 16 are such that the tank circuit has a resonant frequency of 20 kc.

This shock excited ringing oscillator tank circuit continues to oscillate, with some damping due to the resistance in the circuit, until the negative potential on the grid of triode V2 leaks off and triode V2 begins to conduct again, that is, for a period of one millisecond. The output of this tank circuit (waveform "c" in FIG. 8A) is fed through a band pass filter and power amplifier to transmitting ultrasonic transducer T which then transmits this one millisecond pulse of ultrasonic energy in the form of a beamed wave directed, for purposes of this disclosure, at the floor of the exit or entrance lane in which traffic is being detected and counted.

Gate Timing Circuits

The negative trigger pulse is also used to trigger the gate timing circuits shown in the second line of blocks in FIG. 2. The combinations of time constants and inverter amplifiers that make up this portion of the overall circuit are a consecutive series of circuits such as that illustrated in FIG. 5, the output of each inverter amplifier being used to trigger the next succeeding time constant. The negative trigger pulse appearing at point "a" draws instantaneous current through diode 17 and places a negative charge across capacitor 18 and on the grid of triode V3. This negative charge on capacitor 18 leaks off through resistor 19 at an exponential rate determined by the relative sizes of capacitor 18 and resistor 19. The first time constant, designated "upper limit," is designed (for purposes of this disclosure) to cut-off triode V3 for a period of five milliseconds each time capacitor 17 is charged by a negative trigger pulse. (See waveforms "a" and "d" in FIG. 8A.) This upper limit time constant determines the maximum size of the vehicles which can be detected by the apparatus at any given location, as will be explained below.

Since triode V3 is normally conducting, there is a steady voltage drop over plate resistor 20. However, following each trigger pulse, triode V3 is cut off for a period of five milliseconds, as just explained above, and the resultant loss of plate current causes the voltage appearing at point "e" to jump up to the value of the (+) source. At the end of this five millisecond cut-off period, triode V3 once again conducts and the voltage drop over plate resistor 20 reappears, causing the voltage at point "e" to drop away to its original value. This resulting square wave output is shown in waveform "e" in FIG. 8A. The trailing edge of this square wave is used to trigger the next time constant.

FIG. 6 is a schematic diagram of the adjustable time constant and gate generator. When the voltage at point "e" rises during the positive going portion of the above described square wave, diode 22 conducts and charges capacitor 21, the grid of triode V4 remaining at approximately ground potential. However, when the voltage at point "e" drops away with the trailing edge of the square wave, this negative going drop is passed through capacitor 21 and appears at the grid of triode V4, driving the grid far below cut-off. In response to this negative potential, diode 22 appears as an open circuit, and the negative charge must leak off through resistor 23 and potentiometer 24. By varying the resistance of potentiometer 24, the voltage towards which capacitor 21 discharges can be increased or decreased. The higher this voltage becomes, the faster capacitor 21 discharges to the ground potential level set by 22. Thus, by varying potentiometer 24, it is possible to control the time it takes capacitor 21 to discharge up to ground potential which, in turn, controls the period during which triode V4 remains cut off. For purposes of this disclosure, values for capacitor 21, resistor 23 and potentiometer 24 are chosen so that triode V4 will remain cut off for a period of nine milliseconds. Waveform "f" in FIG. 8A shows this resulting voltage which appears at the grid of triode V4.

Since triode V4 is normally conducting, there is normally a steady voltage drop over plate resistor 25. However, this voltage drop disappears when triode V4 is cut off, resulting in the production of a nine millisecond high positive potential square wave at point "g" as shown by waveform "g" in FIG. 8A. This square wave provides the "vehicle" or "V" gate to which further reference shall be made below.

Returning again to FIG. 2, the adjustable "V" gate time constant output (shown as waveform "f" in FIG. 8A) is also fed to the grid of another inverter amplifier (see FIG. 5) resulting in a square wave output at its plate (waveform "h" in FIG. 8A). The trailing edge of this square wave is then used to trigger the gate spacing time constant and inverter amplifier circuits, which are similar to the circuits illustrated schematically in FIG. 5 and explained above, resulting in the production of respective waveforms "i" and "j" as shown in FIG. 8A.

And finally, the trailing edge of square wave output "j" triggers a second time constant and gate generator such as that illustrated in FIG. 6 and explained above. This results, respectively, in the production of waveforms "k" and "m" in FIG. 8A, square wave "m" providing the "ground" or "G" gate to which further reference shall be made below.

Reflected Wave Reception and Detection Circuits

Each pulse of ultrasonic energy beamed from transmitting transducer T, striking either the floor or some other reflecting surface, is reflected back to receiving transducer R. Referring to FIG. 2, each said reflected 20 kc. pulse received at receiving transducer R is converted by the transducer to a weak electrical signal of 20 kc. frequency. This weak signal is first amplified by an input transformer and then amplified twice again by two tuned amplifier circuits. The output of the second tuned amplifier (see waveform "n" in FIG. 8A) is passed through a rectifier and filter circuit which feeds the resulting negative pulse (waveform "p" in FIG. 8A) to the gated detection circuits which are illustrated schematically in FIG. 7.

Referring now to FIG. 7, each negative pulse (waveform "p" in FIG. 8A), corresponding to each reflected pulse of ultrasonic energy received by transducer R, is fed simultaneously to the grids of gated amplifier triodes V5G and V5V. The plates of these gating triodes are directly connected, through plate resistors 26 and 27, to the plates of their respective gate generators (see FIG. 6). Thus, gated amplifier triodes V5G and V5V pass effective plate current only during the periods when a high positive potential is placed upon their plates due to the cutting off of their respective gate generators (see waveforms "g" and "m" in FIG. 8A).

Assuming that a negative pulse appears at the grid of gated amplifier triode V5G at a time when this tube is conducting effectively, gated amplifier triode V5G will be momentarily cut-off. During this momentary cut-off period, the voltage drop across plate resistor 26 will disappear, and the voltage at the plate of gated amplifier triode V5G will momentarily jump up to a high positive potential determined by the square wave output of the "G" gate generator. As the result of this, a positive pulse is produced at point "q" and at the grid of inverter amplifier triode V6G.

On the other hand, if a negative pulse appears at the grid of gated amplifier triode V5G during the time it is effectively cut-off due to insufficient plate potential, this negative pulse would not cause any noticeable change in output voltage at point "q" or at the grid of inverter amplifier triode V6G.

The description just set forth above of the operation of gated amplifier triode V5G also applies to the operation of gated amplifier triode V5V, the appearance of a negative pulse at point "p" effectively producing a positive pulse at point "s" and the grid of inverter amplifier triode V6V only when gated amplifier triode V5V is effectively conducting in response to a "gate" potential (square wave "g" in FIG. 8).

It should be noted that due to the operation of the timing circuits described above, gated amplifier triodes V5G and V5V are "gated" at different times. Thus, for any given negative pulse appearing simultaneously at their respective grids, only one of the gating triodes can pass a positive pulse to the grid of its corresponding inverter amplifier triode.

In spite of the positive potential appearing on their grids, inverter amplifier triodes V6G and V6V are normally cut-off due to the biasing of their cathodes by means of voltage dividers comprising of resistors 28, 29 and 30, 31, respectively. However, any increase in positive potential at the grids of triodes V6G or V6V will over come this cathode bias and cause these tubes to conduct. Thus, each positive pulse produced by gated amplifier triode V5G or V5V at the grid of inverter amplifier triode V6G or V6V will cause the latter to conduct, causing a sudden voltage drop over plate resistor 62 or 63. This results in the production of a negative pulse at point "r" or point "t" each time one or the other of the gated amplifier triodes responds to a reflected pulse signal. (See waveforms "n," "p," "q," and "r" in FIG. 8A, and waveforms "n," "p," "s" and "t" in FIG. 8B.)

As can be seen from the above description, each pulse of reflected ultrasonic energy received by transducer R during the time interval when the "G" gate is "on" (waveform "m" in FIG. 8A) results in the production of a negative pulse at point "r." Similarly, each pulse of reflected ultrasonic energy received by transducer R during the time interval when the "V" gate is "on" (waveform "g" in FIG. 8B) results in the production of a negative pulse at point "t."

When the voltage at point "r" drops suddenly, this drop places a negative charge across both variable coupling capacitor 32 and capacitor 33, since diode 34 appears as an open circuit in response to this negative voltage, while diode 35 conducts. While the size of the drop appearing at point "r" is fairly constant, the relative proportion of this voltage drop appearing over capacitors 32 and 33, respectively, is dependent upon their relative size. That is, as capacitor 32 is made smaller relative to capacitor 33, a large proportion of the overall voltage drop appears across capacitor 32, and, respectively, a smaller proportion of the overall voltage drop appears across capacitor 33. This adjustment is considered further below.

When the voltage at point "r" rises again to its normal level, this positive going voltage change tries to pass through coupling capacitor 32. However, diode 35 now becomes nonconductive in response to this change, while diode 34 conducts, maintaining ground potential at capacitor 32. At the same time, the negative charge on capacitor 33 begins to leak off through resistors 36 and 37. When the invention herein is being used in the way presently under discussion (that is, as a vehicle detector and counter in a parking garage), values for capacitor 33 and resistors 36 and 37 are chosen so that their RC time constant is ten to twenty times longer than the pulse repetition rate of the pulse generator (wave form "a" in FIG. 8A).

Also, in the form presently being described, capacitor 32 should be enough smaller than capacitor 33 to require about 10 successive negative pulses at point "r" in order to build up the negative charge on capacitor 33 to a level sufficient to cut-off relay control triode V7G. When the grid of triode V7G is driven below cut-off and no plate current is being conducted through line 52, relay RG will drop away; and, conversely, when relay control triode V7G is conducting, current passes through line 52, the windings of relay RG to (+), and relay RG picks up.

Similarly, a succession of negative pulses appearing at point "t" will build up a negative potential over capacitor 39, the effect of capacitor 38 and diodes 40 and 41 being the same as that just described above. The negative charge on capacitor 39, which leaks off slowly through resistors 42 and 43, determines the conduction of relay control triode V7V. When relay control triode V7V is conducting, its plate current passes through line 53, either back contact 44 or front contact 45 and the windings of relay RV to (+), thus maintaining RV in its picked up position. Conversely, when the negative voltage at the grid of triode V7V is sufficient to cut it off, the loss of its plate current causes relay RV to drop away.

The relationships between the negative pulses appearing at point "r" or "t," the build of negative potential over capacitor 33 or 39 and at point "u" or "x," the current in plate circuit "w" or "y" of relay control tube V7G or V7V, and the resulting picking-up and dropping-away of relay RG or RV, are shown graphically in FIG. 8C.

It should be noted that while relay RG picks up whenever relay control triode V7G conducts, relay RV, once dropped away opens the plate circuit of triode V7V at front contact 45 and relay control triode V7V can only conduct again to pick up relay RV if relay RG is dropped away, closing the plate circuit of triode V7V by closing back contact 44. This matter is discussed further below.

Also, it should be noted that when relay RG is picked up, closing front contact 46, and relay RV is dropped away, closing back contact 47, a circuit is completed from ground through front contact 46, back contact 47 and line 48 to differential impulse counter 50.

Differential impulse counter 50 is the two-coil type well known in the art. Each time a circuit is closed to one of its coils, an armature is picked up and causes a unit rotation of a counting drum in one direction, while the closing of a circuit to its other coil, causes the counting drum to rotate one unit in the opposite direction. The circuit to each coil must be opened between counts to allow the armature to be repositioned. Thus, differential impulse counter 50 will give only one count each time the above described detection circuit is closed.

It is assumed that the circuit just described has its transducers mounted over the entrance lane of the parking garage, and it is further assumed that the output of a similar circuit (not shown), with transducers mounted over the exit lane of the same parking garage, is fed to differential impulse counter 50 through line 49. In this way, an accurate count can be maintained as to the number of available parking spaces within the garage at any given time.

A modified control circuit for the counter 50 is illustrated in FIG. 7A. This control circuit includes only the front contact 46 of relay RG rather than the series contacts 46 and 47 of relays RG and RV, respectively. When this circuit for the counter is used, the counter is advanced by one count each time that relay RG is picked up. The overall effect is that a vehicle is registered merely by its interruption of the beam of sound pulses so that the normal reflections from the pavement are not received, thereby resulting in the picking up of relay RV. Reception of reflections of the sound pulses from the top of a passing vehicle is not required in this embodiment of the invention in order that a count may be registered on the counter 50.

Operation of Parking Garage Vehicle Detector and Counter

Referring once again to FIGS. 1A and 1B, it is assumed that transducers T and R are mounted ten feet above the floor of the traffic lane which is being monitored. To avoid the unnecessary use of small fractions, the speed of sound will be considered to be the close approximation of 1,000 feet per second, or, as is more pertinent to this disclosure, one foot per millisecond. It is obvious that the transit time required for each pulse of ultrasonic energy transmitted by transducer T to reach the floor and be reflected to transducer R is approximately twenty milliseconds, and assuming also that vehicle 51 in FIG. 1B is five feet high, each pulse of ultrasonic energy reflected from the top of vehicle 51 is received at transducer R approximately ten milliseconds after its transmission from transducer T.

Under normal conditions, the pulse generator is adjusted for a pulse repetition rate of about thirty pulses per second. (This adjustment is made, as explained above, by adjusting potentiometer 7 in FIG. 3.). At this rate, a pulse is transmitted by transducer T every 33 milliseconds, and, when no vehicle is present in the detection lane, a reflected pulse is received at transducer R approximately twenty milliseconds after each transmission.

Referring now to FIG. 8A, it can be seen that during the twenty millisecond lapse between the transmission of a pulse and the reception of its reflection ("n") from the floor, the timing circuits have marked off the five millisecond upper limit, the nine millisecond "V" gate, the five millisecond spacer, and approximately one millisecond of the five millisecond "G" gate. Thus, the reflected ground wave appears at the grids of gated amplifier triodes V5G and V5V (FIG. 7) at a time when triode V5V is cut-off and triode V5G is conducting, resulting in a negative pulse at point "r" but no change in potential at point "t." As long as no vehicle is present, the negative pulses appear at point "r" thirty times each second, and, as explained above and shown in FIG. 8C, this results in the cutting off of relay control triode V7G, causing relay RG to remain dropped away. At the same time, no negative pulses are appearing at point "t," and relay control triode V7V is not cut-off and relay RV is maintained in its picked-up position.

As soon as vehicle 51 appears in the detection lane (FIG. 1B), the floor reflection is cut-off, and transducer R now receives a reflection from the top of vehicle 51. As can be seen from FIG. 8B, this new reflection ("n") is received approximately ten milliseconds after each transmission and arrives during the "V" gate period marked off by the timing circuits. This results in the production of the series of negative pulses at point "t" (FIG. 7) which build up over capacitor 39, cutting off relay control triode V7V, and, in turn, causing relay RV to drop away. At the same time, the reflected pulses ("n") appear at the grid of gating triode V5G at a time when it is effectively cut off due to insubstantial plate potential (as explained above). Thus, the negative pulses which were maintaining the cut-off potential on the grid of relay control triode V7G disappear, and capacitor 33 discharges, permitting triode V7G to conduct and pick up relay RG.

Therefore, with the passage of a vehicle through the detection lane, relay RG picks up, closing front contact 46 (FIG. 7), and relay RV drops away, closing back contact 47, and a circuit is completed to differential impulse counter 50, detecting and counting the passage of the vehicle.

Again the vehicle has passed, the transmitted pulses are once again reflected from the floor and received during the "G" gate time period, and the circuit returns to its normal status with relay RG dropped away and relay RV picked up.

It should be noted that a pulse reflected in less than five milliseconds would arrive during the upper limit period and would not cause a response in either of the gating circuits, since both gating triodes are without effective plate potential at this time. Also, the same is true of reflected pulses received between fourteen and nineteen milliseconds after transmission time, that is, during the gate spacer period. Due to the effect of these non-responsive periods, vehicles higher than seven and one half feet, that is, within two and one half feet of the transducers (less than five millisecond transit time for each pulse), and lower than three feet, that is, more than seven feet from the transducers (pulse transit time greater than fourteen milliseconds), will not be detected by the apparatus. These limits have been arrived at arbitrarily, and it should be obvious that they can be varied merely by varying the particular time constants involved.

Special Features of Detection Circuit

(a) DISCRIMINATION OF PERSONS, ANIMALS AND BIRDS

One of the problems presented by many of the presently utilized vehicle detection devices is that they are responsive to persons and animals as well as vehicles. This problem is particularly vexing in places such as parking garages where there is considerable pedestrian traffic, and even some animal traffic, along with the vehicular traffic being monitored. The invention herein overcomes this problem in part merely by its very nature, because the clothing and hair of humans and the fur and feathers of animals and birds absorb rather than reflect the pulses of ultrasonic energy beamed into the traffic detection lane. Also, the area covered by a person is generally much smaller than the floor area which reflects the transmitted beam of ultrasonic energy, and thus, the presence of a person in the detection area generally does not cut-off the normal ground reflection. However, the invention herein does not rely solely on these phenomena, since some people passing through the detection zone may be carrying packages or wearing hard objects which will reflect some ultrasonic energy as they walk by.

Assuming that persons carrying or wearing reflective objects succeed in cutting off the normal ground reflection, they are still discriminated from vehicles by this invention either on the basis of the short time, relative to vehicles, required for them to pass through the detection zone, or on the basis of the sporadic nature of the reflections received from them. This can be easily understood with the aid of the waveforms shown in FIG. 9A. These waveforms are taken at the same places in the gated detection circuit (FIG. 7) as those illustrated in FIG. 8C and discussed above, the letters designating the waveforms corresponding to the various points similarly lettered in the circuits of FIG. 7.

Each negative pulse in waveform "r" corresponds to a pulse of ultrasonic energy reflected from the floor of the garage, while the negative pulses in waveform "t" correspond to the pulses reflected from a person during the period when the "V" gate is "on."

It can be seen from these waveforms that if a person walks through the detection zone at a fairly fast rate and cuts off the ground reflection (waveform "r") for only a short period, capacitor 33 (FIG. 7) will not discharge sufficiently to allow the voltage at the grid of relay control triode V7G (waveform "u") to rise above-cut-off. Thus, relay RG will remain dropped away and the detection circuit to differential impulse counter 50 will remain open at front contact 46.

Figure 9B:
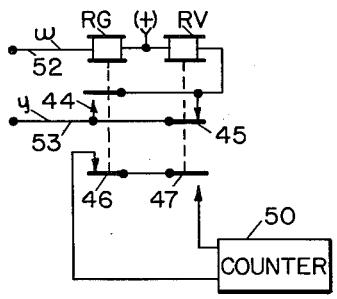

On the other hand, if we assume that a person walks through the detection lane slowly enough to allow the voltage at the grid of relay control triode V7G (waveform "u") to rise above cut-off, triode V7G will conduct plate current (waveform "w") and pick up relay RG as shown in FIG. 9B. Nonetheless, the detection circuit will remain open at back contact 47 since the sporadic reflections from the person (waveform "r") will not be sufficient to drive the grid of relay control triode V7V (waveform "x") below cut-off and triode V7V will continue to conduct, its plate current (waveform "y") passing through line 53 front contact 45 and the windings of relay RV to (+), maintaining relay RV in its picked up position.

Thus, even in the event that a slow moving person carrying or wearing reflective objects passes through the detection lane, he will not be counted as a vehicle, and the count of vehicles within the garage will remain unchanged.

(b) CONVERTIBLE (FABRIC TOP) COMPENSATION

Figure 11A:
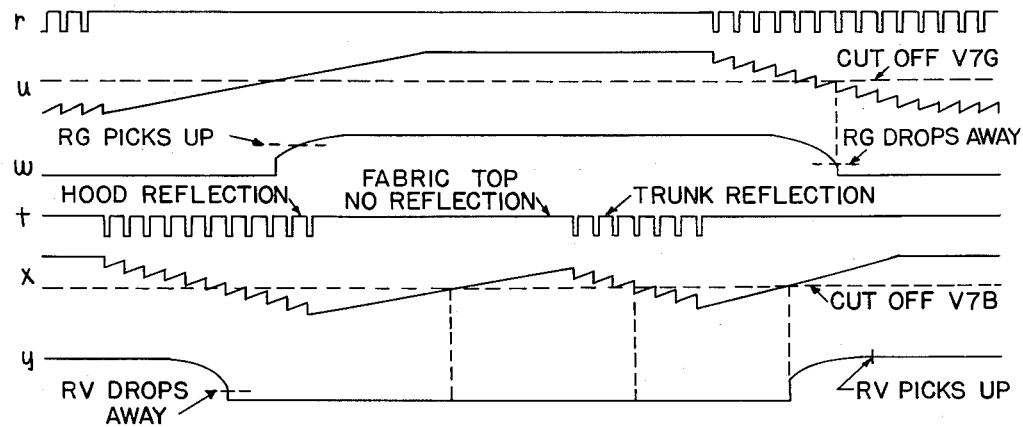
FIGS. 11A and 11B show relay control waveforms and relay positions during the passage of a convertible, showing the method whereby the circuit makes only one count for such a passage in spite of the loss of the reflection of ultrasonic energy due to the fabric top of the convertible.
Figure 10A:
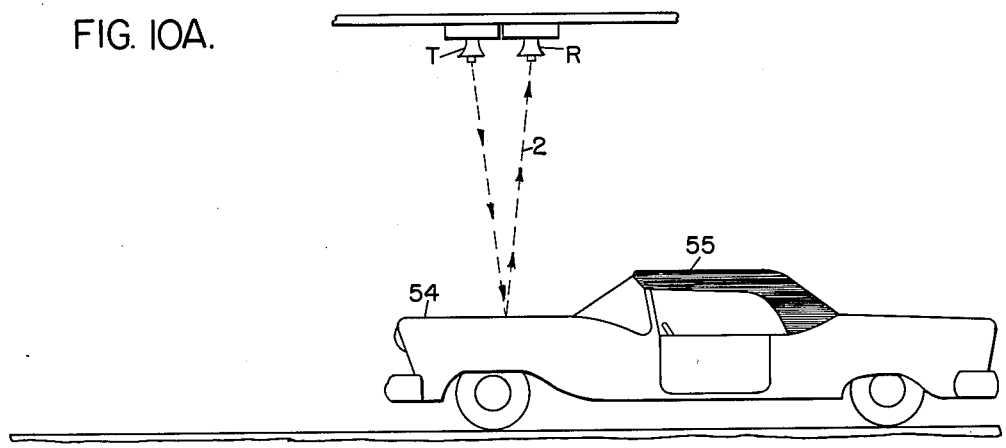
FIGS. 10A, 10B and 10C are used to facilitate the explanation of how the invention provides only one count for vehicles such as convertibles which have major surfaces which do not reflect ultrasonic energy.
Figure 10B:
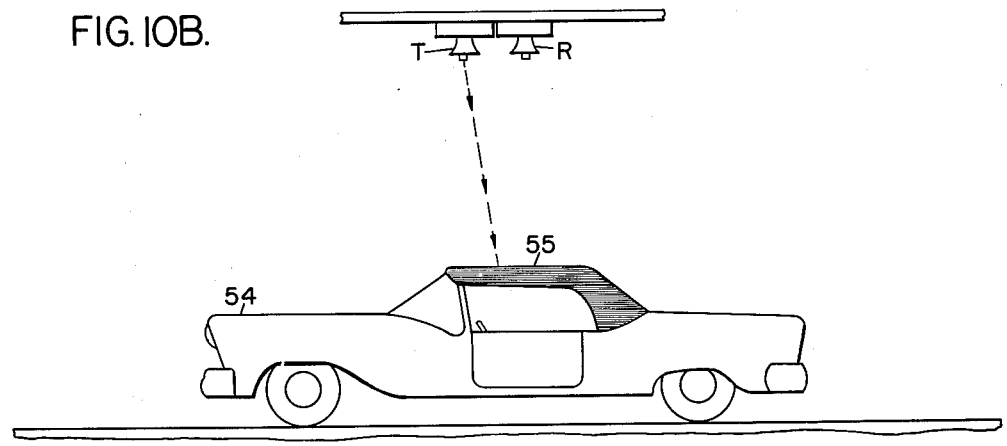
Figure 10C:
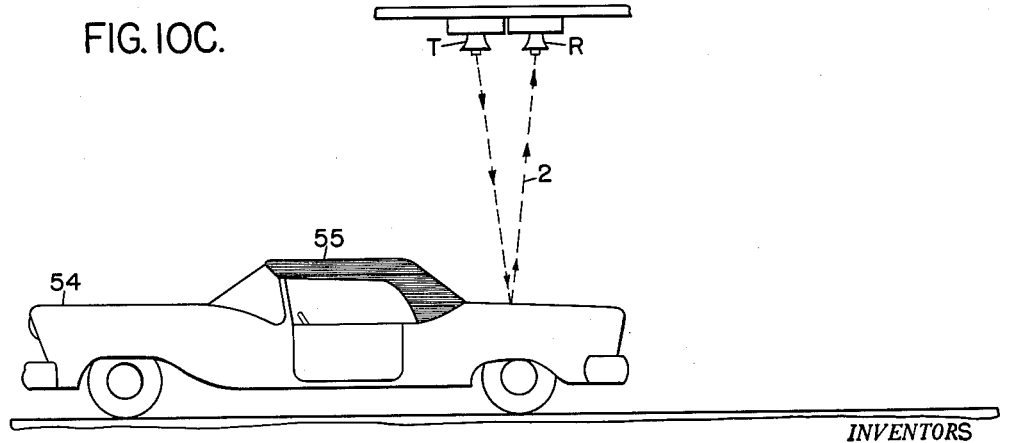

While the fact that certain materials absorb rather than reflect ultrasonic energy helps to assure that people and animals will be discriminated from vehicles by this invention, this same fact raises a particular problem in the case of convertibles and other vehicles with fabric tops. The effect of this phenomenon can be seen in FIGS. 10A, 10B and 10C which illustrate how the fabric top 55 of convertible 54 absorbs the ultrasonic energy transmitted from transducer T. As can be seen from these drawings and the waveforms in FIG. 11A, as convertible 54 begins its passage through the detection zone (FIG. 10A), the "V" gate passes a series of reflections from the hood (waveform "r"). When fabric top 55 passes beneath the detection zone (FIG. 10B), the reflections are lost (waveform "r"), but they are received once again from the trunk section of the car (FIG. 10C and waveform "r"). When the reflections are lost during the passage of fabric top 55, capacitor 39 (FIG. 7) discharges and allows the voltage at the grid of relay control triode V7V (waveform "x") to rise above cut-off. This would normally result in the conduction of triode V7V (see waveform "y" in FIG. 8C) and the picking up of relay RV.

Figure 11B:
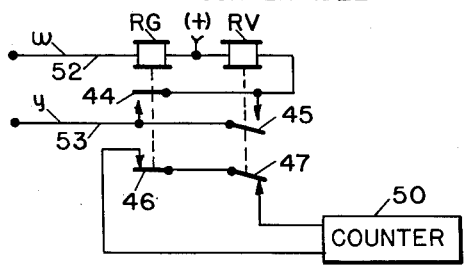

However, as explained above, once relay RV is dropped away, it can only be picked up again if relay RG is dropped away. FIG. 11B illustrates the relative positions of the relays during the time when no ultrasonic energy is being reflected from fabric top 55 of convertible 54. It is readily seen from this drawing that the plate of relay control triode V7V, which is directly connected to line 53, will remain open until relay RG drops away closing the plate circuit through back contact 44 and the windings of relay RV to (+). Due to the loss of ground reflections (wave form "r") during the entire passage of convertible 54, capacitor 33 (FIG. 7) discharges and the voltage at the grid of relay control triode V7G (waveform "u") remains above cut-off. Thus, triode V7G conducts steady plate current (waveform "w") and relay RG remains picked up until convertible 54 has passed and cut-off potential has once more been built up at the grid of triode of V7G. When triode V7G is cut-off once more, relay RG drops away closing back contact 44 and allowing relay RV to be picked up again, and the circuit returns to its normal state.

The circuitry just described assures that any single vehicle will only be detected once, that is, it will cause only one impulse to be sent to differential impulse counter 50, even though its construction is such that during a single passage through the detection line it causes more than one separate and distinct set of reflected pulses to be received by transducer R.

(c) MULTIPLE TRAFFIC FLOWS CHECKED FROM SINGLE CENTRAL OFFICE

One of the particular advantages of the invention herein is its economy and convenience of operation. In a parking garage having several floors and several distinct parking areas, traffic in each area can be detected and counted at a single central location. Each particular area to be monitored is furnished with transmitting and receiving transducers mounted over its entrance and exit lanes. All of the transmitting transducers in the garage are connected in parallel to a common transmitter. Each receiving transducer is connected via shielded cable to a corresponding receiver, the entrance and exit receivers for each area being connected to a differential impulse counter as explained above. All of these units, that is, the common transmitter, the receivers and their relays, and the counters are located in a central office and operated from a common power supply, thereby consolidating all electronic equipment in one location with consequent ease of maintenance and cost reduction through the exploitation of common equipment.

There is no practical limitation to the length of cable connecting the transmitting transducers together or to the length of the shielded wire between each receiving transducer and its associated receiving unit.

It should be pointed out at this time that whereas the disclosure herein deals with separate transmitting and receiving transducers, a single transducer (as shown in FIG. 12), can be used for both transmitting and receiving. This can be accomplished by the use of a hybrid transformer in the plate circuit of the power amplifier and in conjunction with the input transformer of each receiving unit. Such a hybrid transformer network, which is well-known in the art, would deliver power to the transmitting-receiving transducer during the time of transmission, and would deliver reflected pulse energy to the input transformer of the receiving unit during the reception period between transmission pulses.

In the event that single transducers and hybrid transformer networks are used for multiple monitoring, the common transmitter would feed the series of hybrid networks, one for each detection point, and each hybrid network would feed its own separate receiver. In this case, only one shielded cable would be needed between the control office and each detection point.

*Highway Vehicle Detection and Differentiation*

Another application for the invention herein is in the detection and counting of highway traffic. When utilized for this purpose, a single detection unit can differentiate between cars and trucks, keeping a separate and accurate count of both. Such a unit is shown in FIGS. 1C and 1D, with its transducers T and R mounted about twenty feet above the highway and connected by cable to an equipment box 60 containing all of the electronic apparatus. Equipment box 60 is mounted conveniently for purposes of maintenance and reading the counters.

FIG. 13 is a block diagram of the electronic components of the highway traffic detection unit. The transmission and reception circuits of this unit are identical to those of the parking garage unit explained in detail above. The components of the timing circuits, that is, the time constants, inverter amplifiers and gate generators, are similar to those explained above and shown schematically in FIGS. 3, 4, 5, and 6, and the gated detection circuits are similar to the circuits shown in FIG. 7.

By comparing FIG. 13 with FIG. 2, it can be seen that the highway detection unit has the same basic circuitry as the parking garage unit with the addition of a third gate and associated gated detection circuit, and with certain changes in the values of the RC time constants of the timing circuits. The gate timing circuits may be designed to establish gates for pulses reflected from surfaces within various zones, such as those marked out in FIGS. 1C and 1D. FIG. 14A shows a series of waveforms taken at the plates of the various gating and gate-spacing triodes, illustrating the time relationships between the various gating potentials, and FIG. 14B shows the relay portions of the three gated detection circuits.

The operation of the three gated detection circuits is similar to that explained above in conjunction with the parking garage detection unit. Reflected pulses, received simultaneously at the grids of all three gated amplifiers, can be amplified and passed on only if one of the gated amplifiers is gated "on." At any particular time when one of the gated amplifiers is "on" the other two gated amplifiers are effectively cut-off due to insufficient plate potential. The reception of a succession of reflected pulses during any particular gating period builds up a negative potential at the grid of the associated relay control triode, cutting off that triode and causing its associated relay to drop away.

Referring now to FIGS. 14A and 14B, the normal ground reflection arrives forty milliseconds after each transmission pulse (the transducers are mounted twenty feet above the roadway), and each reflected pulse appears during the "on" portion of the "G" gate. The normal reception of successive ground reflected pulses maintains cut-off potential at the grid of the "G" relay control triode, keeping relay RG dropped away.

When car 56 (FIG. 1C) passes through the detection zone, the normal ground reflection is cut-off. Assuming car 56 to be five feet high, the top of car 56 is fifteen feet from the transducers, and pulses of ultrasonic energy reflected from its surface are now received approximately thirty milliseconds after each transmission pulse. The pulses reflected from the top of car 56 arrive during the "on" period of the "C" gate and result in the dropping away of relay RC. At the same time, the loss of the normal ground reflection allows the relay RG to be picked up. This results in the closing of front contact 71 and back contact 72, completing the circuit to car counter 73.

Likewise, the passage of truck 57 (FIG. 1D), cuts off the normal ground reflection and causes reflected pulses to be received sixteen milliseconds after each transmission pulse (assuming top of truck 57 to be twelve feet above ground and eight feet from the transducers). Since the pulses reflected from truck 57 arrive during the "on" period of the "t" gate they result in the dropping away of relay RT while relay RG picks up due to the loss of the normal ground reflection. Thus, during the passage of truck 57, a circuit is completed through front contact 71 and back contact 74 to truck counter 75.

It should be noted that, similar to the relay circuits explained in relation to the parking garage unit, once relay RC or RT is dropped away opening front contact 76 or 77, these relays cannot pick up again until relay RG returns to its normal dropped away position closing back contacts 78 and 79. This circuitry assures that convertibles or trucks with sectional fabric tops will not be counted more than once.

Due to the shorter transit time through the detection zone of vehicles on a highway, as compared to vehicles in a parking garage, it is necessary that the highway detection circuits respond faster. It will be recalled that in the detection circuits explained above in regard to the parking garage detection units, the negative voltage on the grid of the relay control triode (waveform "u" in FIG. 8C) did not build up to cut-off until after nine or ten reflected pulses had been received. This was accomplished by making capacitor 32 very small relative to capacitor 33 (FIG. 7). For purposes of highway detection, capacitor 32 is made much larger relative to capacitor 33. This results in a greater portion of each negative pulse (waveform "r" in FIG. 8C) appearing over capacitor 33, and the grid of the relay control triode is driven below cut-off after the receipt of only a few pulses.

Also, resistors 36 and 37 are made smaller, shortening the time constant at the grid of the relay control triode in order to permit faster recovery between successive sets of reflected pulse signals. Although this reduces the unit's ability to discriminate people, it is assumed that the highway unit is placed well away from the normal flow of pedestrian traffic.

The operation of the various gates and relay circuits just discussed results in the detection of highway vehicles, the differentiation of these vehicles on the basis of height, and the maintenance of a separate count for each differentiated group of vehicles passing through the detection zone.

Whenever the invention herein is used to detect objects in a confined area, care must be taken to assure that spurious signals will not be produced by stray multiple reflections. This problem can best be understood in relation to the parking garage detection unit described above.

Figure 15A:
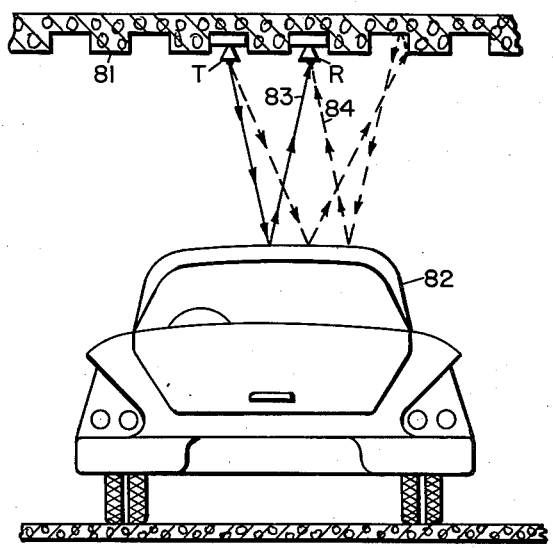
FIGS. 15A and 15B illustrate one particular problem of multiple reflections when the invention is used in a parking garage having a low ceiling of uneven structural design.

FIG. 15A shows transducers T and R mounted in the low ceiling 81 of a parking garage. Ceiling 81 is constructed in the honey-combed structural design common to many reinforced concrete buildings. Assuming the distance from transducers T and R to the floor of the garage to be 8.5 feet, then, when no traffic is present in the detection zone, the normal ground reflection is received approximately seventeen milliseconds after transmission, and the detection circuits are designed so that the "G" gate is "on" at this time.

As car 82 passes through the detection zone, transducer R not only receives normal reflected pulses 83 but also receives multiply-reflected pulses 84. Assuming that car 82 is approximately five feet high, it can be seen that normally reflected pulses 83 travel about seven feet and are received during the "on" period for the "V" gate, about seven milliseconds after transmission. However, multiply-reflected pulses 84 travel about seventeen feet and are received approximately seventeen milliseconds after transmission, thus arriving during the "on" time for the "G" gate. Since reflected pulses are received during both gates, both detection relays are dropped away, opening the detection circuit. As the result of these spurious reflections, a vehicle may not be detected, or it may be detected as two separate vehicles (the ground reflection being lost during the passage of the hood of the vehicle, being established again spuriously as the top of the vehicle passes, and being lost again at the trunk section of the vehicle).

Figure 15B:
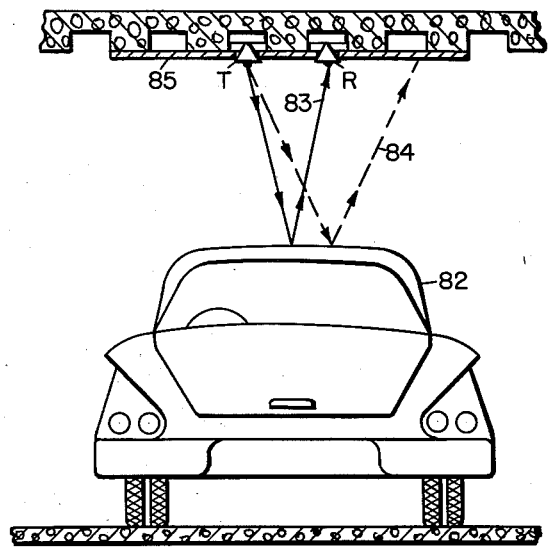

FIG. 15B shows a suggested method for overcoming this problem of multiple reflections. In the area around transducers T and R, ceiling 81 is covered with sound-absorbent material 85. This permits the reception of normal reflections 83, while it absorbs other reflected pulses 84, preventing the multiple reflections which may possibly result in spurious signals.

While the examples of the invention described herein have dealt solely with vehicle detection by means of ultrasonic energy pulses beamed vertically downward, it should be obvious that this invention can be used to detect, differentiate, and count other objects capable of reflecting ultrasonic energy, and that the transducers shown can be placed to beam their pulses at any angle. The normal "ground" reflection utilized throughout this disclosure can be obtained at any other angle of transducer transmission merely by placing a solid reflecting surface behind the objects to be detected and perpendicular to the direction of the transducer's beamed transmissions.

In short, having described two specific embodiments of the present invention, it should be understood that these forms have been selected to facilitate in the disclosure of the invention rather than to limit the number of forms which it may assume. It is to be further understood that various modifications, adaptations and alterations may be applied to the specific forms shown to meet the requirements of practice, without in any manner departing from the spirit or scope of the present invention.

What we claim is:

1. In a system for detecting objects passing a fixed energy reflective surface, transmitting means for producing a beam of intermittent pulses of energy directed at said fixed reflective surface, receiving means responsive both to normal pulses of energy reflected from said fixed reflective surface and to object pulses reflected from the reflective surfaces of said objects passing between said fixed reflective surface and said transmitting means, gating circuit means connected to said receiving means to provide a first output signal for each energy pulse reflected from said fixed surface and a second output signal for each pulse reflected from said reflective surface of each of said objects, whereby the passage of an object in front of said fixed reflective surface normally prevents said first output signal from being provided by said gating circuit means and output means governed by said first and second output signals of said gating means for providing an output indicative of the passage of a single object only in response to the occurrence of at least one of said second signals followed by the recurrence of at least one of said first signals.

2. The system according to claim 1 wherein said output means includes at least one relay operable from a normal to a distinctive condition by said first output signal and also includes at least one other relay operable from a normal to a distinctive condition by said second output signal, said output means registering the passage of said vehicle when said other relay and said one relay are in turn operated to their respective distinctive conditions.

3. The system according to claim 2 wherein said output means also includes relay control means for each said relay adjustably responsive to a predetermined number of said respective first and second signals produced by said gating circuit means for controlling said relays.

4. The system as claimed according to claim 2 wherein said gating circuit means includes timing circuit means set into operation once for each transmitted pulse, said timing circuit means demarcating a first time interval following the time of transmission of each pulse that encompasses the expected time of reception of the reflection of said pulse from said fixed surface and demarcating also a second interval following the transmission of each pulse that encompasses the expected time of reception of the reflection of said pulse from the reflecting surface of each object to be detected, said timing circuit means controlling said gating means to provide said first and second output signals.

5. The system according to claim 1 wherein said output means includes a normal-reflection relay held in a normal condition only by the successive occurrences of said first output signal from said gating means, an object reflection relay operable from its normal condition to its opposite condition only in response to the successive occurrences of said second output signal from said gating means, whereby both said relays are operated from their normal condition when the passage of one of said objects cuts off the reflections from said fixed surface and instead causes reflections from said object, circuit means for restoring said object reflection relay to its normal condition when said second output signal is no longer received only provided that said normal reflection relay has first been restored to its normal condition, said output means further including means for recording the passage of a vehicle only upon the actuation of said object reflection relay from its normal to its opposite condition and back again to its normal condition.

6. A system for the detection of the passage of vehicles passing between a fixed point and a fixed energy reflective surface, transmitting means at said fixed point for generating a succession of energy pulses and for directing said pulses in a directional beam toward such vehicles, said energy pulses impinging upon said fixed surface when no vehicle is present, receiving means responsive to the reflections of said energy pulses from said fixed surface and from said vehicles respectively, and circuit means connected to said receiving means and distinctively responsive to the reflections of said energy pulses from said fixed surface and from said vehicle respectively for providing a distinctive output indicating the passage of a vehicle only when said receiving means has in succession received reflections of transmitted pulses from a passing vehicle and subsequently again from said fixed reflecting surface.

7. The system as defined in claim 6 wherein the energy pulses are sound pulses said fixed reflecting surface is the pavement upon which said vehicles travel, and both said transmitting means and said receiving means include acoustical transducers positioned over the path of said vehicles and are directed downwardly onto the tops of said vehicles.

8. In the system of claim 7 wherein said transducers are positioned adjacent an overhead sound reflective, surface sound-absorbing means being so positioned and arranged with respect to said overhead surface as to shield said surface from said reflected sound pulses, whereby secondary sound reflections from said overhead surface are prevented from being re-reflected and thereafter effective to energize said transducers.

9. The system as defined in claim 6 wherein the energy pulses are sound pulses said fixed reflecting surface is the pavement upon which said vehicles travel, and both said transmitting means and said receiving means include a common acoustical transducer positioned over the path of said vehicles and directed downwardly onto the tops of said vehicles.

10. In a system for detecting vehicles each having at least one energy reflecting surface and each passing in front of a fixed energy reflecting surface, transmitting means for directing a beam of energy toward said fixed surface in a manner to cause said beam to be intercepted by each passing vehicle, receiving means being so positioned and directed as to receive reflections of said transmitted energy from said fixed surface and also from said vehicle, means connected to said receiving means and providing different distinctive first and second outputs in response thereto respectively, and means governed by said last-named means for providing a distinctive output indicative of the passage of a vehicle only when said last-named means provides in succession both said second and first outputs for each passing vehicle.

11. In a system for registering the presence of an object within a detection zone defined by a beam of energy which impinges in the absence of any object upon a fixed energy reflecting surface and alternatively upon said object when it is within said zone energy transmitting means for directing a beam of energy toward said fixed reflecting surface, energy receiving means for receiving both the energy reflected from said fixed reflecting surface and the energy reflected from the energy reflecting surfaces of said object, said receiving means ordinarily receiving either reflected energy from said fixed reflecting surface or alternatively receiving reflected energy from said energy reflecting surfaces of said object but at times concurrently receiving reflected energy both from said fixed reflecting surface and from an object intercepting said beam, means connected to said receiving means to generate a first output signal in response to energy received from said fixed reflecting surface and a second different output signal in response to energy received from the reflecting surfaces of said object, object registration means, and control means connected to said object registration means and responsive to said signal generating means for adjusting said registration means to a registering condition indicative of the presence of said object within said detection zone when said second output signal is produced but not when said second and said first output signals are concurrently being produced.

12. The vehicle registering system of claim 11 wherein said control means includes both a first means and a second means responsive to said signal generating means and adjustable to a distinctive condition by said first and second output signals respectively, said first means being connected to said second means and maintaining said second means in said distinctive condition when once operated thereto for so long as said first signal is not being produced by said generating means, said registration means being adjusted to said registering condition for so long as said second means is in its said distinctive condition.

13. The vehicle registration system of claim 11 wherein said transmitted energy is in the form of discrete pulses having a period at least equaling the propagation time of a pulse from said transmitting means to said fixed reflecting surface and back to said receiving means, said generating means comprising a timing means which demarcates one time interval following the transmission of each pulse which encompasses the expected reception time by said receiving means of a reflection pulse from said fixed reflecting surface and demarcating also another time interval which encompasses the expected reception time by said receiving means of a reflection pulse from said object reflecting surface, said generating means being controlled by said timing means to produce said first signal in response to each reflection pulse received by said receiving means during said one time interval and to produce said second signal in response to each reflection signal received by said receiving means during said another time interval.

14. In a system for registering the individual passage of objects at least some of which have both energy reflective and non-reflective surfaces through a detection zone defined by a beam of energy directed toward and impinging upon each said object when it is within said detection zone but impinging instead upon a more distant energy reflective surface only when no object is within said detection zone, whereby the presence of said object in said detection zone at least intermittently causes reflections of energy to be received from said object and ordinarily cuts off reflections from said more distant energy reflective surface, the combination comprising, transmitting means for transmitting said beam of energy, receiving means for receiving energy reflected from said more distant reflective surface and also receiving the energy reflected from said reflective surfaces of each object, means connected to said receiving means to generate a first output signal for energy received from said more distant reflective surface and a different second output signal for energy received from the reflective surfaces of said object, registering means responsive to said signals and adjustable to a distinctive condition indicative of the presence of any object in said detection zone when said second signal is generated, and means connected to said registering means and governed by said first output signal for maintaining said registering means in its said distinctive condition when it is once adjusted thereto until said first output signal is again generated even though said second signal is at times not generated by said generating means as the non-reflective surfaces of said object have said beam of energy impinge thereon.

15. A system for selectively detecting objects of different classes as each passes through a detection zone defined by a beam of energy which impinges upon each object when it is within said zone but alternatively impinges upon a fixed more distant reflective surface when said object is not within said zone, transmitting means for transmitting said beam of energy, receiving means for receiving reflections of the transmitted energy both from the reflective surfaces of said object and from said fixed reflective surface, said objects of different classes having their energy reflecting surfaces at respectively different ranges of distance from said fixed reflective surface, means connected to said receiving means to generate a different distinctive object signal for energy received from reflective surfaces at each of said different range of distances and to generate a still different normal reflection signal for energy received from said fixed reflective surface, at least one registering means for each of said different classes of objects, and respective means connected to each said registering means and to said generating means and having selectively applied thereto the particular object signal produced by said generating means for objects in the class corresponding to said registering means and having also selectively applied thereto said normal reflection signal to adjust said respective registering means to a distinctive condition to indicate the presence of any object of the respective class in said detection zone only upon the concurrence of the presence of the particular object signal selectively applied thereto and the absence of said normal reflection signal but preventing said registering means from adjustment to its said distinctive condition whenever both said particular object signal and said normal signal are concurrently applied thereto.

16. The object detecting system of claim 15 which further includes means for each adjusting means governed by said normal reflection signal for maintaining said registering means in said distinctive condition when once operated thereto for so long as said normal reflection signal is not applied thereto.

17. In a system for registering the presence of an object within a detection zone defined by a beam of energy which is directed toward and impinges upon said object when it is within said zone, transmitting means for directing a beam of energy toward said object receiving means including a transducer for receiving reflections of said transmitted energy from said object when it is within said detection zone, first fixed means upon which said transmitted energy can impinge only when said object is not within said detection zone, said first means directing energy toward said transducer only when it receives energy from said transmitting means, said receiving means ordinarily receiving energy from said first means or alternatively receiving reflected energy from said object in accordance with whether said object is absent or is intercepting said beam respectively but with said receiving means at times receiving energy concurrently from both said first means and from said object, signal generating means connected to said receiving means and producing first and second distinctive signals according to whether it receives reflected energy from said object or receives energy from said first means, and registering means responsive to said signal generating means for registering the presence of said object within said detection zone only when said receiving means receives said reflected energy from said object and concurrently therewith does not receive said energy from said first means but being prevented from registering the presence of an object when said receiving means concurrently receives energy both from said first means and from an object.

18. The system as defined in claim 17 including means to maintain said registering means in said registering condition to continually indicate the presence of said object within said detecting zone for so long as said receiving means fails to receive said energy from said first means even though said receiving means may only intermittently receive energy from said object.

19. The object registering system of claim 17 in which said first means is an energy reflecting surface which reflects the energy impinging thereon from said transmitting means back to said receiving means.

20. The object registering system of claim 17 in which the transmitted energy is in the form of discrete pulses of sound energy, said signal generating means is normally nonresponsive, and timing means connected to said signal generating means enabling said signal generating means to respond to energy impinging upon said receiving means only throughout a first time interval encompassing the expected reception of a sound pulse from said object and throughout a later time interval encompassing the expected reception of a sound pulse from said first means, said receiving means producing said first output signal for each sound pulse received during said first interval and said second output signal for each sound pulse received during said later interval, said registering means being adjusted to its registering condition when said first signal is produced but not when both said first and second signals are concurrently produced.

References Cited in the file of this patent

UNITED STATES PATENTS

| | | |
|---|---|---|
| 1,982,341 | Hitchcock | Nov. 27, 1934 |
| 2,403,527 | Hershberger | July 9, 1946 |
| 2,491,029 | Brunn | Dec. 13, 1949 |
| 2,494,990 | De Lano | Jan. 17, 1950 |
| 2,560,587 | Miller | July 17, 1951 |
| 2,622,140 | Muller | Dec. 16, 1952 |
| 2,702,342 | Korman | Feb. 15, 1955 |
| 2,794,974 | Bango | June 4, 1957 |
| 2,866,600 | Cooper | Dec. 30, 1958 |

FOREIGN PATENTS

| | | |
|---|---|---|
| 785,885 | Great Britain | Nov. 6, 1957 |

UNITED STATES PATENT OFFICE
CERTIFICATE OF CORRECTION

Patent No. 3,042,303                        July 3, 1962

Hugh C. Kendall et al.

It is hereby certified that error appears in the above numbered patent requiring correction and that the said Letters Patent should read as corrected below.

Column 3, lines 7 and 8, strike out "FIG. 7A illustrates a modified circuit for the control of the counter shown in FIG. 7."; column 8, line 63, beginning with "A modified control circuit" strike out all to and including "on the counter 50." in line 2, column 9; column 15, line 29, for the claim reference numeral "2" read -- 1 --.

Signed and sealed this 7th day of April 1964.

(SEAL)
Attest:

ERNEST W. SWIDER
Attesting Officer

EDWARD J. BRENNER

Commissioner of Patents